July 27, 1954
K. STELZENMÜLLER
2,685,061
APPARATUS FOR TRACING SHORT CIRCUITS
IN ELECTRICAL EQUIPMENT
Filed Dec. 19, 1950
2 Sheets-Sheet 1
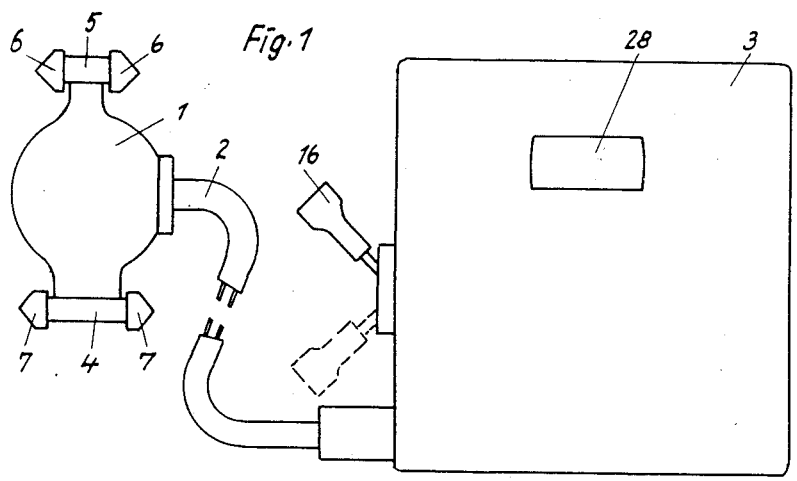
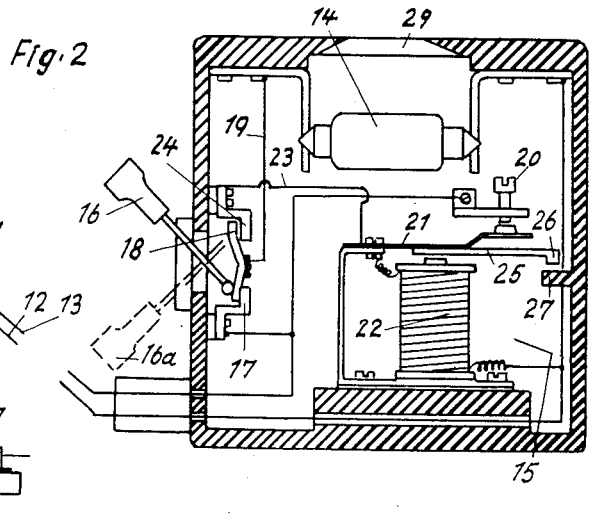
Inventor
Kurt Stelzenmüller
By Young, Emery & Thompson
Attys July 27, 1954
K. STELZENMÜLLER
2,685,061
APPARATUS FOR TRACING SHORT CIRCUITS IN ELECTRICAL EQUIPMENT
Filed Dec. 19, 1950
2 Sheets-Sheet 2
Fig. 5
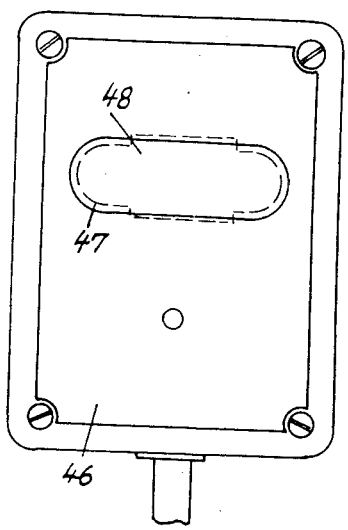
Fig. 4
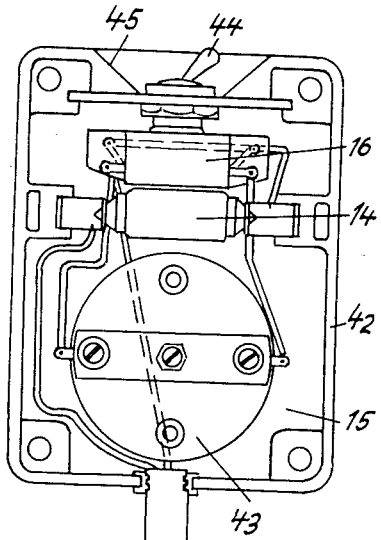
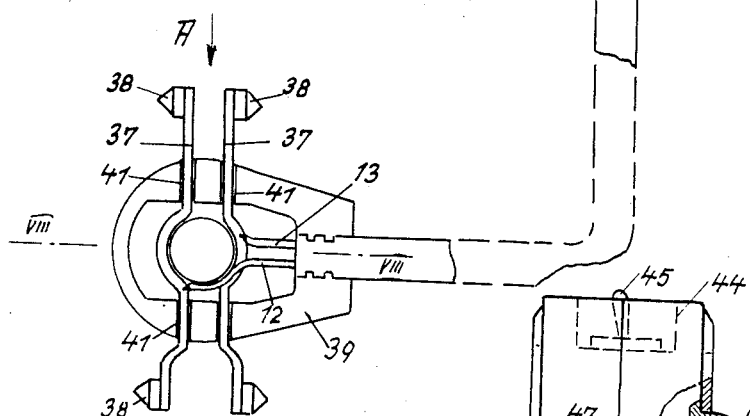
Fig. 7
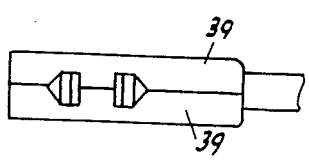
Fig. 8
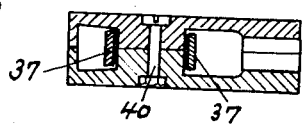
Fig. 6
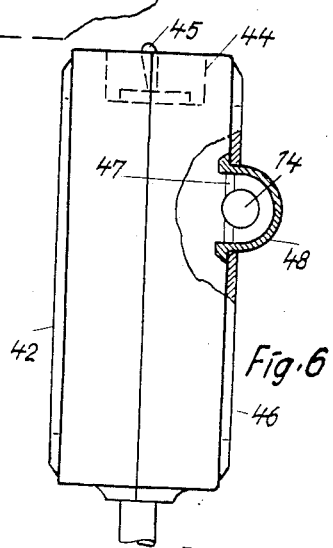
Inventor
Kurt Stelzenmüller
By Young, Emery & Thompson
Attys.

Patented July 27, 1954

2,685,061

UNITED STATES PATENT OFFICE 2,685,061

APPARATUS FOR TRACING SHORT CIRCUITS IN ELECTRICAL EQUIPMENT

Kurt Stelzenmüller, Wurzburg, Germany

Application December 19, 1950, Serial No. 201,508

Claims priority, application Germany January 23, 1950

11 Claims. (Cl. 324—51)

The present invention relates to apparatus for tracing short circuits in electrical equipment and particularly, but not exclusively, in the electrical equipment of land vehicles and aircraft.

It is an object of the present invention to provide a very simple apparatus for indicating short circuits in electric circuit systems.

A special object of the invention is to provide means permitting quick and easy connection of said apparatus to the electric circuit system to be tested.

Another object of the invention is to provide in such apparatus means permitting both acoustical and optical indication of short circuits.

Still another object of the invention is to provide means for adapting such apparatus for use in connection with electric circuit systems of different voltages and/or size of the fuses.

With these and further objects in view, the apparatus according to the present invention comprises a plug having at least two contacts which are made to correspond dimensionally to the terminal contacts of the fuses employed in the respective electric circuits system and adapted to be engaged in the fuse holders thereof to replace the corresponding fuses, an indicator adapted to give a signal when connected to the source of current of the circuit system, and a cable for connecting the indicator to the plug.

More particularly, the apparatus includes optical and acoustic signal means, which are connected in parallel, the acoustic signal means consisting substantially of a buzzer which co-operates with a rythmic break, more particularly, an electromagnetic break and the optical signal means preferably consisting of an incandescent lamp.

According to a preferred form of the invention a switch is provided by means of which the incandescent lamp can alternatively be connected to the plug directly or through the electromagnetic break. Thus it is possible to use the apparatus even in connection with electric circuit systems having a higher working voltage than that for which the lamp is designed.

The plug may comprise two or more elastic connecting strips each provided at its opposite ends with metal caps fitting in the fuse holders in such a way that the two metal caps at one end of the two strips are spaced from each other by a distance adapted for plugging said caps into one type of fuse holder for fuses of a certain shape while the two metal caps at the opposite end of the two strips are spaced from each other by another distance for plugging said caps into another type of fuse holder for fuses of another length or shape.

Further objects and features of the invention will be seen from the following detailed description in connection with the accompanying drawings showing by way of example and purely schematically some embodiments of the invention and in which:

Figure 1 is an elevation of a device consisting of a connector, a cable and an indicator;

Figure 2 is a section through the connector and indicating device according to Fig. 1;

Fig. 2a is a circuit diagram thereof.

Figure 3 is the circuit diagram of an electrical circuit system with the new indicating device connected to it.

Fig. 4 is a front view of a further embodiment of the invention, with the covers removed from the indicating and plug devices;

Fig. 5 is a front view of the indicating device of Fig. 4, with the cover attached thereto;

Fig. 6 is a side view of the indicating device;

Fig. 7 is an elevation of the plug viewed in the direction indicated by the arrow A in Fig. 4, and Fig. 8 is a section on line VIII—VIII of Fig. 4.

Referring to the drawings, and first to Figs. 1 to 3, 1 indicates a plug which is connected by a cable 2 with an indicator 3. This plug 1 which is made of electrically insulating material, has two connecting pieces 4 and 5 which are provided with metal caps 6 and 7 respectively. These connecting pieces are made to correspond with the fuses used in the electrical equipment of land vehicles and the like.

In the constructional embodiment shown, two connecting pieces 4, 5 are shown which correspond respectively to fuses of two different lengths. Figure 2 shows how the plug 1 with the connecting piece 4 is inserted between the fuse holder clips 8, 9 of an electrical apparatus. As shown, the connecting pieces 4, 5 are connected in parallel, that is to say the two pairs of caps 6, 6 and 7, 7 are connected together by electrical conductors 10 and 11 respectively. These conductors are connected in turn to the leads 12, 13 of the cable 2.

The indicating device comprises both optical and acoustic indicating means, which are connected in parallel. According to Figure 2, there is provided for this purpose an incandescent lamp 14 and a buzzer 15 which co-operates with a circuit breaker. Since the working voltages in vehicles and the like vary, for example in domestic motor vehicles they may be either six or twelve volts, the indicating device is so arranged that it can make use of one and the same electric lamp 14 for two different operating voltages. For this purpose, a change-over switch 16 is provided, the circuit connections of which are clearly shown in Figure 2. It may be assumed that the fuse holder clip 8 is connected with the positive pole, and the fuse holder clip 9 with the negative pole of the electrical equipment to be investigated. Then the current flows through the conductors 11, 13 to the indicator passing not only through the reversing switch contacts 17, 18 of the conductor 19 to the electric lamp 14 but also through the coil of the magnet 22 of the buzzer and thence through the contact spring 21 to the contact screw 20 of the circuit breaker. In the other position of the switch, i. e. the position indicated by dotted lines at 16a, the connection leading directly to the electric lamp is interrupted and the current now flows through the circuit breaker 20, 21, the lead 23, the switch contacts 24, 18 and the lead 19, to the lamp 14.

Since, due to the introduction of the circuit breaker 20, 21, the current flows now to the electric lamp with periodic interruptions, the average voltage which is actually applied to the lamp 14 is now only about half the normal working voltage. Consequently, one and the same electric lamp 14 can be used for one given voltage (for example 6 volts) when the change-over switch is in the position indicated in broken lines at 16a, and will also serve for a higher circuit voltage (for example 12 volts) when the change-over switch is in the position indicated in full lines at 16.

In the constructional embodiment illustrated, the armature 25 connected with the circuit breaker spring 21 is constructed in the form of a small hammer 26, which drums on a projection 27 formed on the casing and thereby produces an acoustic noise. In order to render the lamp 14 easily visible, openings 28, 29 are provided in the said casing.

Figure 3 illustrates by way of example the application of the indicating device to a power-driven land vehicle. 30 indicates a head lamp, the positive lead 31 of which passes in known manner through the fuse box 32 and the switch 33 to the battery 34, while the mass 35 of the chassis is used as the negative lead.

A fault, i. e. a short circuit between the damaged positive lead 31 and the mass 35 is indicated at 36. The device 3 which is inserted, in place of the fuse which is now defective, into the holder clips 8, 9 of the latter and indicates the existence of the short circuit both optically, by illumination of the lamp 14, and also acoustically, by the buzzing noise produced by the buzzer 15. If now the lead 31 is gently lifted by hand bit by bit away from the mass 35, the lamp 14 will be extinguished and the buzzer 15 will become silent as soon as the place 36 is reached where the short circuit exists. If, however, the short circuit only occurs when the apparatus is in a state of vibration, for example when a power-driven land vehicle is travelling, but not when the apparatus is stationary, then the appropriate damaged lead 31 must not be raised from the mass 35 but must be pressed bit by bit against it. As soon then as the defective part of the lead 31 comes into contact with the mass 35, the indicator device will come into operation. Any short circuit in electrical equipment of the kind indicated can thus be traced quickly and easily with the aid of the apparatus according to the present invention.

Figures 4 to 8 illustrate a further advantageous constructional embodiment of the invention. In this case, the plug 1 consists of two resilient contact strips 37 which are arranged approximately parallel to one another, and which are adapted to be connected to the leads 12 and 13 of the cable.

The contact strips 37, which are provided with contact points 38, are mounted in a two-piece housing 39 made of electrically insulating material and project from the said housing 39 as shown in Figure 4.

According to Figures 4, 7 and 8, the housing of the plug consists of two similar parts 39 connected together by a bolt 40 and each formed with slits 41 for the reception of the contact strips. This plug, which consists of only a few component parts, can be manufactured simply and cheaply. The indicating device arranged in the casing 42 consists, in this case also, of an incandescent lamp 14, a switch 16 and a buzzer 15, the anchor of which is connected, in this embodiment, to a diaphragm 43. As shown in Figure 4, the operating lever 44 of the switch 16 is counter-sunk into a recess 45 in the casing 42. In this manner, accidental switching-on or -off and even damage to the switch is avoided when the indicating device is placed on the floor.

According to Figures 5 and 6, the casing 42 is closed by a cover 46. This cover has a suitable opening 47 for the lamp 14 which projects into this opening (see Figure 6), so that it projects above the top surface of the indicating device. This arrangement is provided in order to insure that the lamp is visible on all sides. In order to protect the lamp a transparent cowl 48 of synthetic resin or like material is fixed on the cover 46.

I claim:

1. Apparatus for tracing short circuits in electrical circuit systems of motor cars which have at least one fuse removably fitted in a fuse holder, said apparatus comprising a bipolar indicator of the kind which is adapted to give an indication when electrically connected in a closed circuit, a plug having at least one pair of spaced contacts shaped and arranged to correspond with the contacts of the fuse in the motor car circuit system and adapted, when the apparatus is in use, to be engaged in the fuse holder in place of said fuse, and electrical conductors connecting each contact of said pair of spaced contacts to one pole of said indicator whereby an indication will be produced in the indicator if the circuit system is short-circuited.

2. Apparatus as per claim 1, wherein the indicating device comprises both optical and acoustic means which are connected in parallel.

3. Apparatus as per claim 1, wherein the indicating device comprises an incandescent lamp and a buzzer which are connected in parallel.

4. Apparatus for tracing short circuits in electrical circuit systems of motor cars having at least one fuse removably fitted in a fuse holder, said apparatus comprising a bipolar indicator of the kind which is adapted to give an indication when electrically connected in a closed circuit, a plug, two connecting pieces carried by said plug, metal caps fitted on opposite ends of each of said connecting pieces and electrical conductors connecting said metal caps to said indicator and in parallel with one another, said connecting pieces with their caps being dimensioned to correspond with, and to replace as required, motor car fuses of two different standard lengths respectively, the appropriate connecting piece being engaged in the fuse holder of the replaced fuse, whereby an indication will be produced in the indicator if the circuit belonging to either of the fuses is short-circuited.

5. Apparatus for tracing short circuits in electrical circuit systems of motor cars, comprising a plug at least part of which is made to correspond dimensionally with the fuses inserted in the fuse holders of a motor car and is adapted to be plugged into said fuse holders to replace the corresponding fuses, an indicating device having a pair of contacts and adapted, when an electrical circuit path is opened between said contacts, to give a warning signal, a flexible cable connecting said plug to said indicating device, and a lever-operated switch mounted in said indicating device so that its lever is located in a countersunk depression in the outer surface of said indicating device, said switch being connected in a circuit including said plug, said flexible cable and said indicating device.

6. Apparatus for tracing short circuits in electrical circuit systems of motor cars which have at least one fuse removably fitted in a fuse holder, said apparatus comprising an indicator of the kind which is adapted to give a visual indication when electrically connected in a closed circuit, a plug having a pair of spaced contacts shaped and arranged to correspond with the contacts of the fuse of the circuit system and adapted, when the apparatus is in use, to be engaged in the fuse holder of the circuit system in place of said fuse, and electrical conductors connecting said spaced contacts to said indicator, said indicator including a casing, an incandescent lamp mounted on, and projecting above the top surface of, said casing for the provision of said visual indication, and a transparent cowl arranged to cover and protect said lamp.

7. Apparatus for tracing short circuits in motor car circuit systems which have at least one fuse, removably mounted in a fuse holder, said apparatus comprising a plug having at least two contacts which are made to correspond dimensionally to the terminal contacts of the fuse employed in the respective circuit systems and adapted to be plugged into the fuse holder thereof to replace the corresponding fuse, an indicator adapted to give a signal when energized by the source of current of the circuit system and comprising an acoustic device including a rythmic break, an optical signal device connected in parallel to the acoustic signal device, a switch adapted to selectively insert the rythmic break into the circuit of the optical signal device, and a cable for connecting the indicator to the plug.

8. Apparatus for tracing short circuits in motor car circuit systems which have at least one fuse removably mounted in a fuse holder, comprising a plug including a main body, at least two contact carriers mounted in said main body so as to be insulated from each other, with their ends projecting from the main body, contact members at said projecting ends for resilient insertion in said fuse holder on removal of the fuse, an indicator adapted to give a signal when energized by the source of current of the circuit system, and a cable for connecting the indicator to the contact members of the plug.

9. Apparatus for tracing short circuits in motor car circuit systems which have at least one fuse removably mounted in a fuse holder, comprising a plug including a main body, at least two auxiliary parts projecting from said main body on different sides thereof, one auxiliary part having an end portion shaped to correspond with a fuse of one standard size and the other auxiliary part having an end portion shaped to correspond with a fuse of a different standard size, pairs of contacts arranged on each of the end portions so as to correspond with the contacts of corresponding fuses, and a pair of terminals mounted in said main body and electrically connected in parallel with the contacts on said end portions, an indicator adapted to give a signal when energized by the source of current of the circuit system, and a cable for connecting the indicator to the terminals of the plug.

10. Apparatus for tracing short circuits in motor car circuit systems which have at least one fuse removably mounted in a fuse holder, a plug comprising a main body of electrically insulating material, two approximately parallel spaced contact strips mounted in said main body and both projecting therefrom on two opposite sides thereof, and contact point elements mounted laterally on the projecting ends of said contact strips, said contact point elements being arranged to correspond with the contacts of the fuse in the circuit system and being adapted to be engaged in the fuse holder in place of said fuse, an indicator adapted to give a signal when energized by the source of current of the circuit system, and a cable for connecting the indicator to the terminals of the plug.

11. Apparatus as per claim 10, wherein the main body of the plug is composed of two similar parts and screw means for securing said parts together, each part being formed with a pair of parallel grooves and the pairs of grooves in both parts combining to provide slots in the main body for the reception of the contact strips.

References Cited in the file of this patent

UNITED STATES PATENTS

| Number | Name | Date |
|---|---|---|
| 913,105 | Conant | Feb. 23, 1909 |
| 925,412 | Addie | June 15, 1909 |
| 1,680,841 | Bartlett | Aug. 14, 1928 |
| 2,023,916 | Dante | Dec. 10, 1935 |
| 2,410,691 | Stevens | Nov. 5, 1946 |
| 2,422,589 | Samzelius | June 17, 1947 |